(12) United States Patent
Almquist

(10) Patent No.: US 7,230,530 B1
(45) Date of Patent: Jun. 12, 2007

(54) CHILD SEAT SAFETY SYSTEM FOR VEHICLES

(76) Inventor: Kelly A. Almquist, 6703 La Concha Pass, Austin, TX (US) 78749

( * ) Notice: Subject to any disclaimer, the term of this patent is extended or adjusted under 35 U.S.C. 154(b) by 158 days.

(21) Appl. No.: 11/152,711

(22) Filed: Jun. 15, 2005

(51) Int. Cl.
*G08B 1/08* (2006.01)
*H04Q 7/00* (2006.01)

(52) U.S. Cl. ............... 340/539.15; 340/665; 340/666; 340/667; 180/271; 180/273

(58) Field of Classification Search ............ 340/425.5, 340/539.15, 665, 666, 667; 180/271, 273
See application file for complete search history.

(56) References Cited

U.S. PATENT DOCUMENTS

| | | | |
|---|---|---|---|
| 5,260,684 A | 11/1993 | Metzmaker | |
| 5,581,234 A | 12/1996 | Emery et al. | |
| 5,783,871 A | 7/1998 | LeMense | |
| 5,949,340 A | 9/1999 | Rossi | |
| 6,104,293 A * | 8/2000 | Rossi | 340/573.1 |
| 6,661,341 B2 | 12/2003 | Masuda et al. | |
| 2006/0061201 A1 * | 3/2006 | Skinner | 297/468 |
| 2006/0244828 A1 * | 11/2006 | Ho et al. | 348/148 |

* cited by examiner

*Primary Examiner*—Jeffery Hofsass
*Assistant Examiner*—Samuel J. Walk

(57) ABSTRACT

A vehicle safety system includes independently operable child location determining mechanism that has a sound wave emitting module nested therein and care giver location determining mechanism for determining a location of the care giver. The care giver location determining mechanism includes a housing that fits on a key ring, a processor including a memory, a speaker coupled to the processor, a power supply source coupled to the speaker and the processor, and a receiver for communicating with the sound emitting module. The memory includes software instructions causing the system to perform the steps of generating and transmitting a first RF signal to the child location determining mechanism, and generating and transmitting a second RF signal to the child location determining mechanism. The first and second signals are responsive to the care giver location determining mechanism when the care giver moves beyond the predetermined distance from the child location determining mechanism.

12 Claims, 3 Drawing Sheets

CHILD SEAT SAFETY SYSTEM FOR VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicle safety systems and, more particularly, to a child seat safety system for vehicles for notifying a caregiver whether a child is seated in a car seat during unattended time intervals.

2. Prior Art

It seems that every summer there are news reports of children dying when they are left behind in a closed vehicle. If a baby or toddler is inadvertently or purposefully left in a vehicle, the child can quickly be in danger of serious heat-related problems. Even if the vehicle's windows are cracked open, the vehicle is parked in the shade, and the outside temperature seems temperate to an adult, the interior temperature of the vehicle can quickly become unbearable to a child trapped therein. Tragically, some well-meaning but stressed and busy parents forget to remove their sleeping infant or toddler from the car and the child succumbs to the heat.

In response to this dilemma, a number of child car seat safety systems have been introduced to the prior art in an attempt to prevent such tragedy. Although such systems are adequate in their designated purpose, they still have many shortcomings. One disadvantage of many such systems is the fact that they do not provide a portable notification means that can be carried by and notify a parent of an unattended child left in a vehicle. Other systems are caused to activate the notification means when the driver's door is opened and a child is still present in their child safety seat. Such a method of activation can become annoying as one tends to open the driver's door occasionally for a variety of reasons other than to leave the car. Unfortunately, this may lead to the user deactivating the system in order to prevent the annoying siren from sounding all the time.

Accordingly, a need remains for a child seat safety system for vehicles in order to overcome the above-noted shortcomings. The present invention satisfies such a need by providing a child seat safety system for vehicles that is easy to use, provides peace of mind to parents, and achieves increased safety for babies and toddlers. Such a system advantageously reminds a driver when a child is left unattended in a car seat when the driver leaves and moves out of the proximity of the seat sensor. This conveniently ensures that a tendency for busy parents to be forgetful does not result in the death of their child.

BRIEF SUMMARY OF THE INVENTION

In view of the foregoing background, it is therefore an object of the present invention to provide a child seat safety system for vehicles. These and other objects, features, and advantages of the invention are provided by a vehicle safety system for notifying a caregiver whether a child is seated in a car seat during unattended time intervals.

The vehicle safety system includes a mechanism for determining a location of a child such that care giver can conveniently know whether a child is seated in the car seat. Such a child location determining mechanism includes a sound wave emitting module nested therein. The child location determining mechanism preferably further includes a flexible and disposable pad suitably sized and shaped for resting on a car seat. Such a pad is removably positional directly on a bottom portion of the car seat such that the pad is intercalated between a child and the bottom portion of the car seat during operating conditions. The pad has monolithically formed top and bottom surfaces. A sensor is interfitted between the top and bottom surfaces in such a manner that the sensor is isolated from an exterior of the pad. An internal power supply source is electrically coupled to the sensor.

A mechanism is included for determining a location of the care giver such that the vehicle safety system can effectively know whether the care giver has traveled a predetermined distance away from the car seat. Such a care giver location determining mechanism includes a housing suitably sized and shaped to fit on a key ring. A speaker is electrically coupled to the processor. An internal power supply source is electrically coupled to the speaker and the processor A processor includes a memory electrically coupled thereto. Such a memory includes software instructions for causing the system to perform a plurality of steps. One such a step includes generating and transmitting a first control signal to the child location determining mechanism when at least one of the predetermined parameters is detected. At least one predetermined parameter is detected when the care giver toggles the vehicle from a first operating mode to a second operating mode while the child is seated in the car seat.

Another step includes generating and transmitting a second control signal to the child location determining mechanism when at least one predetermined parameter is no longer detected. Such first and second control signals are responsive to the care giver location determining mechanism when the care giver moves a distance greater than the predetermined distance from the child location determining mechanism such that the care giver is audibly reminded of the presence of the child during operating conditions. The first and second control signals include RF signals.

The care giver location determining mechanism may include a flexible and disposable pad directly positioned on a driver seat, a sensor interfitted inside the pad, and an internal power supply source seated within the pad and electrically coupled to the sensor. Such a sensor is directly and electrically coupled to a horn of the vehicle such that the vehicle horn is advantageously automatically activated when the care giver disengages the driver seat while the child is seated on the child seat. The care giver determining mechanism preferably further includes a wrist band and a flexible cord that has opposed end portions tethered to the wrist band and the child seat. Such a wrist band is removably connectable about a care giver's wrist.

The child location determining mechanism and the care giver location determining mechanism cooperate for advantageously sending an alert signal to the care giver when a plurality of predetermined parameters are detected. Such care giver location determining and child location determining mechanisms are independently operable. The care giver location determining mechanism further includes a receiver in active wireless communication with the sound wave emitting module when the care giver is located within the predetermined distance from the child location determining mechanism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
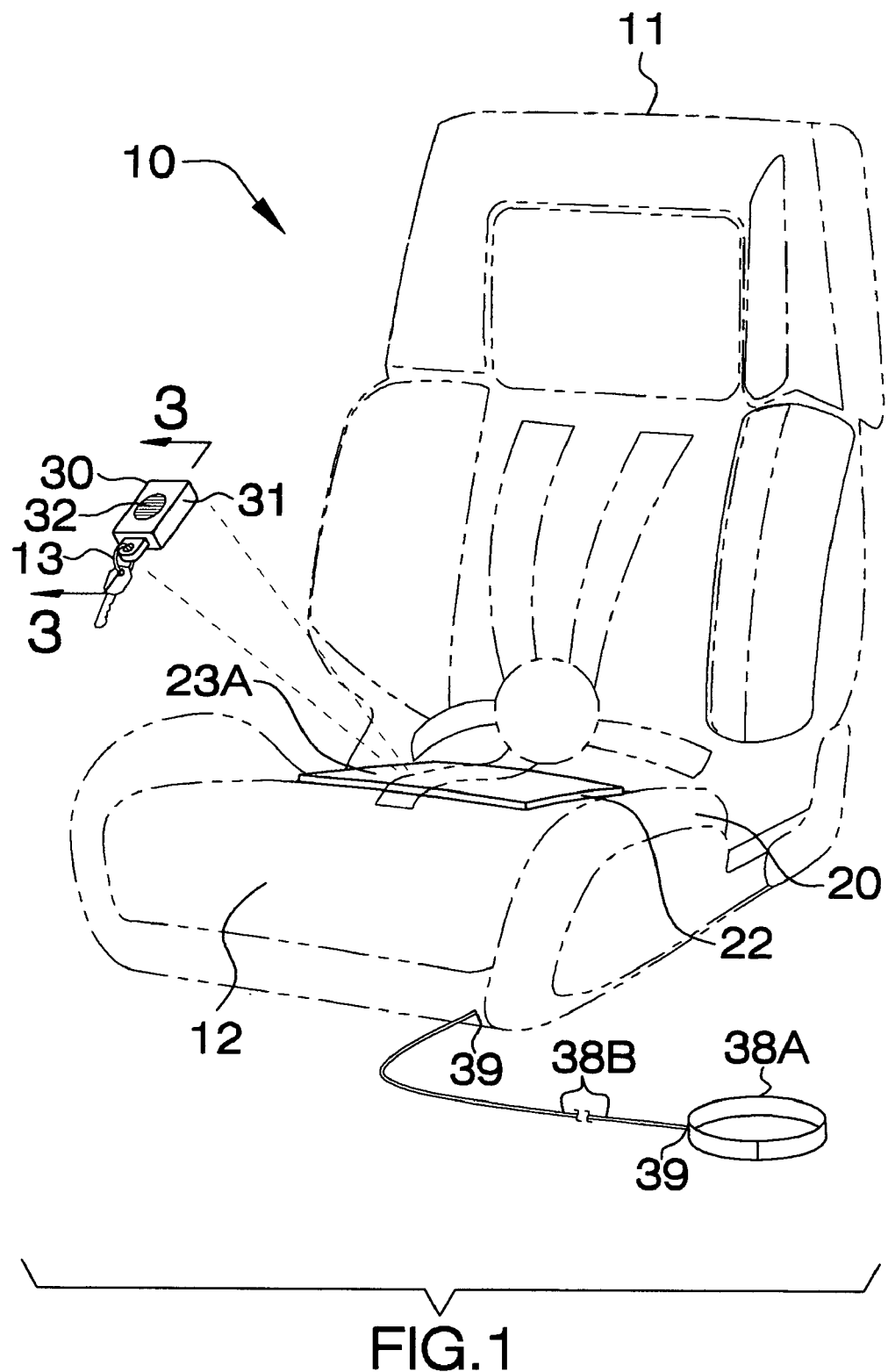
FIG. 1 is a perspective view showing a child seat safety system for vehicles, in accordance with the present invention.
Figure 2:
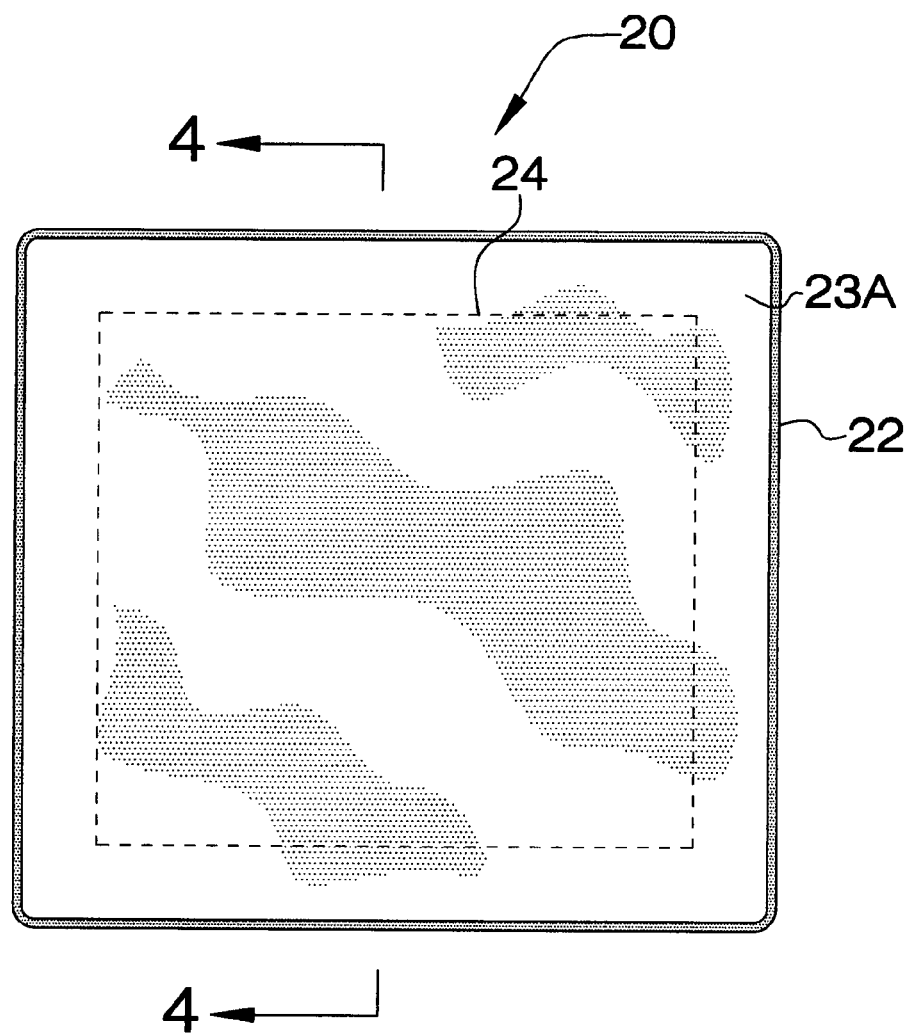
FIG. 2 is a top plan view of the flexible and disposable pad shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1–5 by the reference numeral 10 and is intended to provide a child seat safety system for vehicles. It should be understood that the system 10 may be used to detect the presence of infants and toddlers in many different types of setting and should not be limited in use to only child safety car seats.

Figure 4:
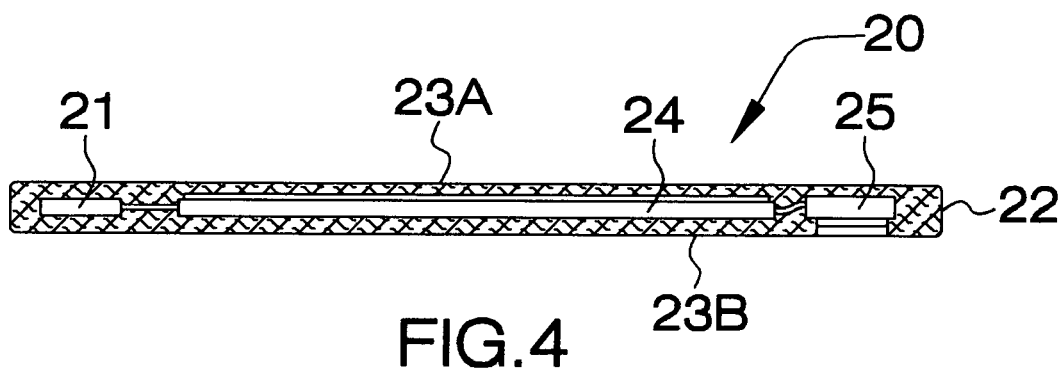
FIG. 4 is a cross-sectional view of the pad shown in FIG. 2, taken along line 4—4.

Referring initially to FIGS. 1 and 4, the system 10 includes a mechanism 20 for determining a location of a child, which is essential such that care giver can advantageously and conveniently know whether a child is seated in the car seat 11. This feature thus prevents the care giver from inadvertently leaving a child in a locked and closed vehicle, where dehydration and death can rapidly occur. Such a child location determining mechanism 20 includes a sound wave emitting module 21 nested therein. The sound wave emitting module 21 is crucial for providing an audible noise that can easily be heard from a distance with the purpose of drawing a person's attention.

The child location determining mechanism 20 further includes a flexible and disposable pad 22 suitably sized and shaped for resting on a car seat 11. Of course, the pad 22 may be produced in a variety of different shapes, sizes and colors so as to accommodate variously shaped children and children car seats, as is obvious to a person of ordinary skill in the art. Such a pad 22 is removably positional directly, with no intervening elements, on a bottom portion 12 of the car seat 11 such that the pad 11 is effectively intercalated between a child and the bottom portion 12 of the car seat 11 during operating conditions. This ensures that the pad 22 always bears the weight of the child, which is important and advantageous for allowing the system 10 to operate properly.

The pad 22 has monolithically formed top 23A and bottom 23B surfaces. A sensor 24 is interfitted between the top 23A and bottom 23B surfaces in such a manner that the sensor 24 is effectively isolated from an exterior of the pad 22. This feature advantageously prevents the sensor 24 from being damaged by external elements, such as food and liquids that come in contact with the pad 22, and excessive pressure that may be exerted on the pad 22. An internal power supply source 25 is electrically coupled to the sensor 24, which is vital and convenient for providing operating power thereto over an extended period of time.

Figure 3:
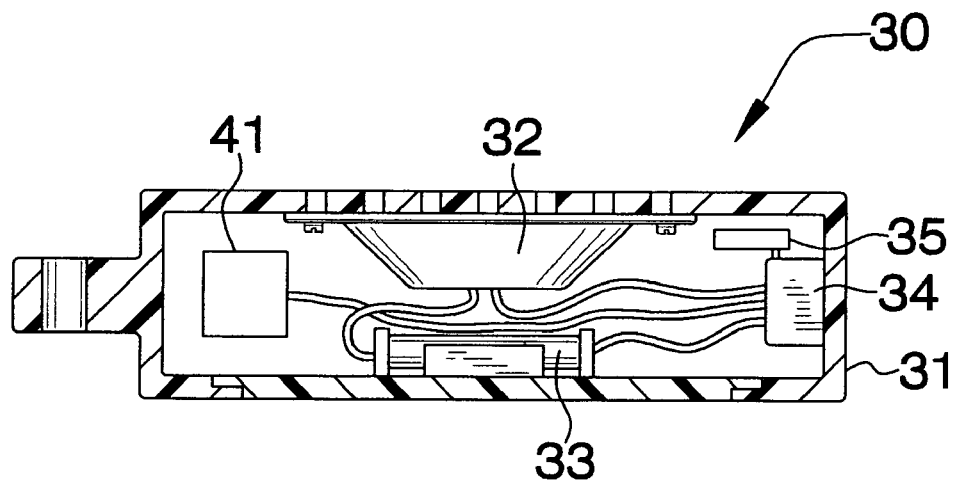
FIG. 3 is a cross-sectional view of the care giver location determining mechanism shown in FIG. 1, taken along line 3—3.
Figure 5:
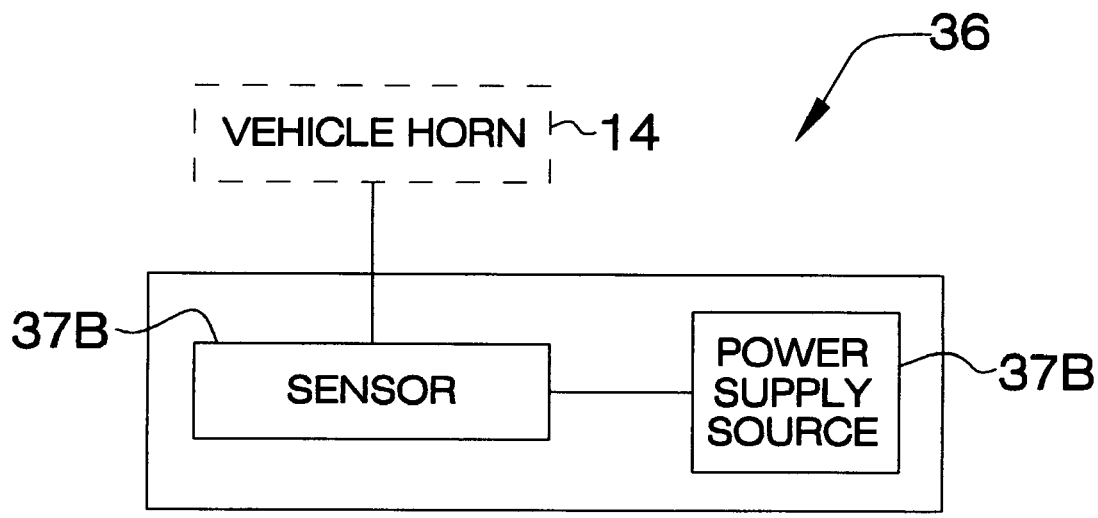
FIG. 5 is a schematic diagram of the flexible and disposable pad of the care giver location determining mechanism, in accordance with the present invention.

Referring to FIGS. 1, 3 and 5, a mechanism 30 is included for determining a location of the care giver, which is critical such that the vehicle safety system 10 can effectively know whether the care giver has traveled a predetermined distance away from the car seat 11. Such a care giver location determining mechanism 30 includes a housing 31 suitably sized and shaped to fit on a key ring 13. This feature advantageously ensures that the care giver always has the care giver location determining mechanism 30 on their person when they wish to operate the vehicle. Of course, the housing 31 may be alternately sized and shaped, for example to be attached to the care giver's side by a clip, as is obvious to a person of ordinary skill in the art. A speaker 32 is electrically coupled to the processor 34 (described herein below). An internal power supply source 33 is electrically coupled to the speaker 32 and the processor 34.

Referring to FIG. 3, a processor 34 includes a memory 35 electrically coupled thereto. Such a memory 35 includes software instructions that are important for causing the system 10 to perform a plurality of steps which lead to the user being adequately notified of a predetermined parameter. One such a step includes generating and transmitting a first control signal to the child location determining mechanism 20 when at least one of the predetermined parameters is detected. At least one predetermined parameter is detected when the care giver toggles the vehicle from a first operating mode to a second operating mode while the child is seated in the car seat 11.

Another step includes generating and transmitting a second control signal to the child location determining mechanism 20 when the at least one predetermined parameters are no longer detected. Such first and second control signals are responsive to the care giver location determining mechanism 30 when the care giver moves a distance greater than the predetermined distance from the child location determining mechanism 20 such that the care giver is advantageously audibly reminded of the presence of the child during operating conditions. The first and second control signals include RF signals. Of course, such first and second control signals may include alternate signals, as is obvious to a person of ordinary skill in the art.

Referring to FIG. 5, the care giver location determining mechanism 30 also includes a flexible and disposable pad 36 directly positioned, with no intervening elements, on a driver seat (not shown), a sensor 37A interfitted inside the pad 36, and an internal power supply source 37B seated within the pad 36 and electrically coupled to the sensor 37A. Such a sensor 37A is directly and electrically coupled, with no intervening elements, to a horn 14 of the vehicle such that the vehicle horn 14 is advantageously automatically activated when the care giver disengages the driver seat pad 36 while the child is seated on the child seat. This effectively alerts the care giver to the child's presence, which is critical and advantageous for preventing the care giver from inadvertently leaving the child in a locked and closed vehicle.

The care giver determining mechanism 30 further includes a wrist band 38A and a flexible cord 38B that has opposed end portions 39 tethered to the wrist band 38A and the child seat 11. Such a wrist band 38A is removably connectable, with no intervening elements, about a care giver's wrist and operates independently from the pad 36 to remind the care giver that a child is located in the car seat 11. This is especially useful and advantageous for those individuals who are deaf and can not hear the noise emitted from the vehicle horn 14 or the sound emitting module 21. The care giver location determining mechanism 30 further includes a receiver 41 in active wireless communication with the sound wave emitting module 21 when the care giver is located within the predetermined distance from the child location determining mechanism 20.

Referring to FIG. 1, the child location determining mechanism 20 and the care giver location determining mechanism 30 cooperate for advantageously sending an alert signal to the care giver when a plurality of predetermined parameters are detected, as described herein above. Such care giver location determining 30 and child location determining 20 mechanisms are independently operable so that both or either one independently can be activated to notify a care giver of the presence of a child in the car seat 11.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle safety system for notifying a caregiver whether a child is seated in a car seat during unattended time intervals, said vehicle safety system comprising:

means for determining a location of a child such that a care giver can know whether a child is seated in the car seat, said child location determining means comprising a sound wave emitting module nested therein;

means for determining a location of the care giver such that said vehicle safety system can know whether the care giver has traveled a predetermined distance away from the car seat;

wherein said child location determining means and said care giver location determining means cooperate for sending an alert signal to the care giver when a plurality of predetermined parameters are detected, said care giver location determining means comprising a housing suitably sized and shaped to fitting on a key ring, a speaker electrically coupled to said processor, an internal power supply source electrically coupled to said speaker and said processor, a processor, and a memory electrically coupled to said processor, said memory including software instructions for causing said system to perform the steps of:

generating and transmitting a first control signal to said child location determining means when at least one of said predetermined parameters is detected, said at least one predetermined parameters being detected when the care giver toggles the vehicle from a first operating mode to a second operating mode while the child is seated in the car seat, and generating and transmitting a second control signal to said child location determining means when said at least one predetermined parameters are no longer detected;

wherein said care giver location determining means comprises a receiver in active wireless communication with said sound wave emitting module when the care giver is located within said predetermined distance from said child location determining means, said first and second control signals being responsive to said care giver location determining means when the care giver moves a distance greater than said predetermined distance from said child location determining means such that the care giver is audibly reminded of the presence of the child during operating conditions.

2. The vehicle safety system of claim 1, wherein the child location determining means comprises:

a flexible and disposable pad suitably sized and shaped for resting on a car seat, said pad being removably positional directly on a bottom portion of the car seat such that said pad is intercalated between a child and said bottom portion of the car seat during operating conditions, said pad having monolithically formed top and bottom surfaces;

a sensor interfitted between said top and bottom surfaces in such a manner that said sensor is isolated from an exterior of said pad; and an internal power supply source electrically coupled to said sensor.

3. The vehicle safety system of claim 1, wherein said care giver location means further comprises:
    a flexible and disposable pad directly positioned on a driver seat;
    a sensor interfitted inside said pad; and
    an internal power supply source seated within said pad and electrically coupled to said sensor;
    wherein said sensor is directly and electrically coupled to a horn of the vehicle such that the vehicle horn is automatically activated when the care giver disengages the driver seat while the child is seated on the child seat.

4. The vehicle safety system of claim 1, wherein said care giver determining means further comprises:
    a wrist band and a flexible cord having opposed end portions tethered to said wrist band and the child seat, said wrist band being removably connectable about a care giver's wrist.

5. A vehicle safety system for notifying a caregiver whether a child is seated in a car seat during unattended time intervals, said vehicle safety system comprising:
    means for determining a location of a child such that a care giver can know whether a child is seated in the car seat, said child location determining means comprising a sound wave emitting module nested therein;
    means for determining a location of the care giver such that said vehicle safety system can know whether the care giver has traveled a predetermined distance away from the car seat;
    wherein said child location determining means and said care giver location determining means cooperate for sending an alert signal to the care giver when a plurality of predetermined parameters are detected;
    wherein said care giver location determining means and said child location determining means are independently operable, said care giver location determining means comprising
        a housing suitably sized and shaped to fitting on a key ring,
        a speaker electrically coupled to said processor,
        an internal power supply source electrically coupled to said speaker and said processor,
        a processor, and
        a memory electrically coupled to said processor, said memory including software instructions for causing said system to perform the steps of:
            generating and transmitting a first control signal to said child location determining means when at least one of said predetermined parameters is detected, said at least one predetermined parameters being detected when the care giver toggles the vehicle from a first operating mode to a second operating mode while the child is seated in the car seat, and
            generating and transmitting a second control signal to said child location determining means when said at least one predetermined parameters are no longer detected;
    wherein said care giver location determining means comprises a receiver in active wireless communication with said sound wave emitting module when the care giver is located within said predetermined distance from said child location determining means, said first and second control signals being responsive to said care giver location determining means when the care giver moves a distance greater than said predetermined distance from said child location determining means such that the care giver is audibly reminded of the presence of the child during operating conditions.

6. The vehicle safety system of claim 5, wherein the child location determining means comprises:
    a flexible and disposable pad suitably sized and shaped for resting on a car seat, said pad being removably positional directly on a bottom portion of the car seat such that said pad is intercalated between a child and said bottom portion of the car seat during operating conditions, said pad having monolithically formed top and bottom surfaces;
    a sensor interfitted between said top and bottom surfaces in such a manner that said sensor is isolated from an exterior of said pad; and
    an internal power supply source electrically coupled to said sensor.

7. The vehicle safety system of claim 5, wherein said care giver location means further comprises:
    a flexible and disposable pad directly positioned on a driver seat;
    a sensor interfitted inside said pad; and
    an internal power supply source seated within said pad and electrically coupled to said sensor;
    wherein said sensor is directly and electrically coupled to a horn of the vehicle such that the vehicle horn is automatically activated when the care giver disengages the driver seat while the child is seated on the child seat.

8. The vehicle safety system of claim 5, wherein said care giver determining means further comprises:
    a wrist band and a flexible cord having opposed end portions tethered to said wrist band and the child seat, said wrist band being removably connectable about a care giver's wrist.

9. A vehicle safety system for notifying a caregiver whether a child is seated in a car seat during unattended time intervals, said vehicle safety system comprising:
    means for determining a location of a child such that a care giver can know whether a child is seated in the car seat, said child location determining means comprising a sound wave emitting module nested therein;
    means for determining a location of the care giver such that said vehicle safety system can know whether the care giver has traveled a predetermined distance away from the car seat;
    wherein said child location determining means and said care giver location determining means cooperate for sending an alert signal to the care giver when a plurality of predetermined parameters are detected;
    wherein said care giver location determining means and said child location determining means are independently operable, said care giver location determining means comprising
        a housing suitably sized and shaped to fitting on a key ring,
        a speaker electrically coupled to said processor,
        an internal power supply source electrically coupled to said speaker and said processor,
        a processor, and
        a memory electrically coupled to said processor, said memory including software instructions for causing said system to perform the steps of:
            generating and transmitting a first control signal to said child location determining means when at least one of said predetermined parameters is detected, said at least one predetermined parameters being detected when the care giver toggles the vehicle from a first operating mode to a second operating mode while the child is seated in the car seat, and generating and transmitting a second control signal to said child location determining means when said at least one predetermined parameters are no longer detected;

wherein said care giver location determining means comprises a receiver in active wireless communication with said sound wave emitting module when the care giver is located within said predetermined distance from said child location determining means, said first and second control signals being responsive to said care giver location determining means when the care giver moves a distance greater than said predetermined distance from said child location determining means such that the care giver is audibly reminded of the presence of the child during operating conditions, said first and second control signal comprise: RF signals.

10. The vehicle safety system of claim 9, wherein the child location determining means comprises:

a flexible and disposable pad suitably sized and shaped for resting on a car seat, said pad being removably positional directly on a bottom portion of the car seat such that said pad is intercalated between a child and said bottom portion of the car seat during operating conditions, said pad having monolithically formed top and bottom surfaces;

a sensor interfitted between said top and bottom surfaces in such a manner that said sensor is isolated from an exterior of said pad; and an internal power supply source electrically coupled to said sensor.

11. The vehicle safety system of claim 9, wherein said care giver location means further comprises:

a flexible and disposable pad directly positioned on a driver seat;

a sensor interfitted inside said pad; and an internal power supply source seated within said pad and electrically coupled to said sensor;

wherein said sensor is directly and electrically coupled to a horn of the vehicle such that the vehicle horn is automatically activated when the care giver disengages the driver seat while the child is seated on the child seat.

12. The vehicle safety system of claim 9, wherein said care giver determining means further comprises:

a wrist band and a flexible cord having opposed end portions tethered to said wrist band and the child seat, said wrist band being removably connectable about a care giver's wrist.

* * * * *